United States Patent [19]

Cheng

[11] Patent Number: 5,487,132
[45] Date of Patent: *Jan. 23, 1996

[54] END USER QUERY FACILITY

[76] Inventor: Viktor C. H. Cheng, 164 Lentor Loop #07-01, Singapore 2678, Singapore, 2678

[*] Notice: The term of this patent shall not extend beyond expiration date of Pat. No. 5,325,465.

[21] Appl. No.: 348,742

[22] Filed: Nov. 30, 1994

Related U.S. Application Data

[63] Continuation of Ser. No. 154,343, Nov. 17, 1993, abandoned, which is a continuation-in-part of Ser. No. 846,522, Mar. 4, 1992, Pat. No. 5,325,465.

[51] Int. Cl.$^6$ .................................................. G06F 15/18
[52] U.S. Cl. ........................ 395/63; 395/77; 364/419.19
[58] Field of Search .................... 395/63, 77; 364/419.19

[56] References Cited

U.S. PATENT DOCUMENTS

| | | |
|---|---|---|
| 4,815,005 | 3/1989 | Oyanagi . |
| 4,982,340 | 1/1991 | Oyanagi . |
| 5,043,929 | 8/1991 | Kramer . |
| 5,072,406 | 12/1991 | Ammon . |
| 5,123,103 | 6/1992 | Ohtaki . |
| 5,193,185 | 3/1993 | Lanter . |
| 5,224,206 | 6/1993 | Simoudis . |

OTHER PUBLICATIONS

Brochure pertaining to a Software Interfaces product.
A Survey of the Universal Relation Model, Leymann, Data & Knowledge Engineering, vol. 4, 1989, pp. 305–320.
The Universal Relation as a User Interface, Ullinson, Principles of Database and Knowledge Based Systems, vol. II, Chapter 17, 1989.
Consequences of Assuming a Universal Relation, W. Kent, 1981 ACM Transactions on Database Systems, vol. 6, No. 4, pp. 539–556.
EasyTalk Product Backgrounder from Intelligent Business Systems.

Primary Examiner—Donald E. McElheny, Jr.

[57] ABSTRACT

An end user query technology is taught which is capable of automatically understanding the database model and guiding the user to scout for the desired information, thereby increasing productivity and ease of information access. The user is freed from the need to understanding the database model, with the end user query facility of this invention quickly guiding the user to acquire the information. This is made possible by the end user query facility of this invention first recapturing the application semantics from the existing database model to provide a set of derived semantics. The derived semantics are then used by the end user query facility to intelligently guide the user to scout for the desired information in the database. In addition, the derived semantics can be easily updated by the end user query facility when the database model is changed.

37 Claims, 11 Drawing Sheets

END USER QUERY FACILITY

CROSS REFERENCE TO RELATED APPLICATION

This application is a Continuation of U.S. application Ser. No. 08/154,343, filed Nov. 17, 1993, now abandoned, which in turn is a Continuation-in-part application of Ser. No. 07/846,522, filed Mar. 4, 1992, now U.S. Pat. No. 5,325,465.

TECHNICAL FIELD

This invention pertains to end user query technology, and more specifically to an end user query facility which scouts for information by understanding the database model and guiding the user.

BACKGROUND

This invention pertains to end user query technology, introducing a novel approach to end user information access. Current end user query techniques require the user to understand database models in order to access information. For example, using prior art database models in which it is not uncommon to have dozens if not in excess of a hundred separate data base files interrelated, it is necessary for the database programmer to know in which file the desired piece of information is located, and then appropriately connect the files to achieve an orderly access of the specific file containing the desired information. This requires a fair amount of skill on the part of the database programmer and intimate familiarity of that programmer with the structure of the database which may be extremely complex. Furthermore, training new database programmers on an existing database model requires considerable amount of time and effort. One example of a prior art knowledge-based information retrieval system is the EASY-TALK product available from Intelligent Business Systems of Milford, Conn. However, it appears that the EASY-TALK product requires the database developer to explicitly input to the EASY-TALK system the semantics of the database.

SUMMARY OF THE INVENTION

In accordance with the teachings of this invention, it has been determined that there would be great usefulness in providing an end user query technology which is capable of automatically understanding the database model and guiding the user to scout for the desired information, thereby increasing productivity and ease of information access. In accordance with the teachings of this invention, the user is freed from the need to understanding the database model, with the end user query facility of this invention quickly guiding the user to acquire the information. This is made possible by the end user query facility of this invention first recapturing the application semantics from the existing database model to provide a set of derived semantics. The derived semantics are then used by the end user query facility to intelligently guide the user to scout for the desired information in the database. In addition, the derived semantics can be easily updated by the end user query facility when the database model is changed.

DETAILED DESCRIPTION

Overview

The following briefly describes one embodiment of this invention which is in the reporting language known as QUIZ. The language is part of a fourth generation language known as POWERHOUSE from COGNOS Incorporated of Canada. However, it is to be understood that the teachings of this invention are equally applicable to any end user query technology, including languages other than QUIZ.

Figure 1:
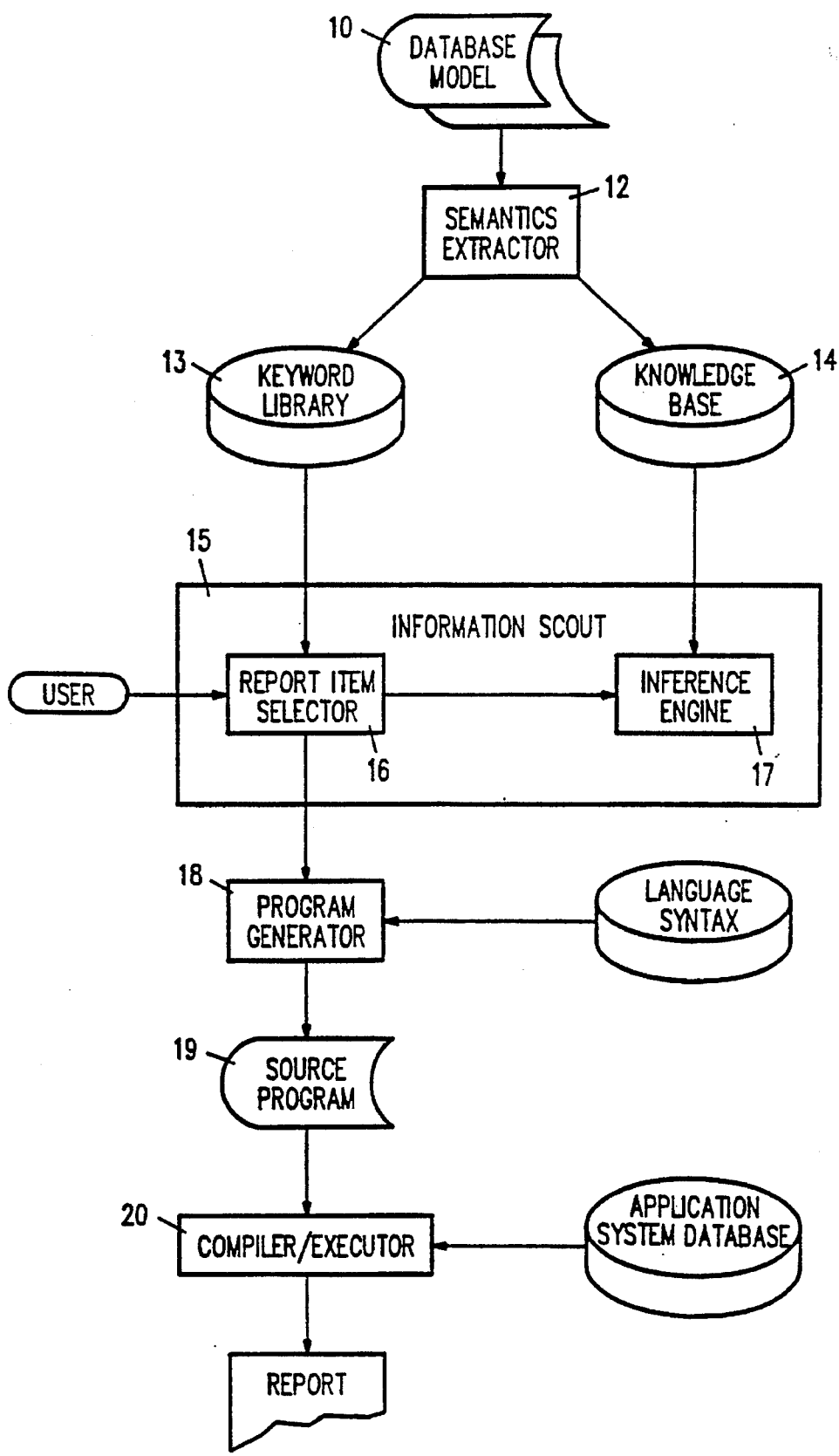
FIG. 1 is a flow chart depicting one embodiment of an end user query facility constructed in the accordance with the teachings of this invention.

FIG. 1 depicts the operation of and interaction between the following modules:

a. The Semantics Extractor. Semantics Extractor 12 reads Database Model 10 of an application system and extracts the semantics of the database model. The semantics are stored in Keyword Library 13 as a list of keywords based on the item definitions and in Knowledge Base 14 as a list of file linkages of the database model. This is a key feature of the present invention and differs from the prior art in that prior art systems require a database developer or manager to explicitly define and provide the semantics of the database to the end user query facility.

b. The Information Scout. Information Scout 15 guides the user to specify the items to be reported in order to obtain the information he wants. This is carried out in two steps. First, Report Item Selector 16 prompts the user for keywords that suggest the desired data item, for example DATE. Using a look-alike keyword search method, all items in Keyword Library 13 containing DATE are listed. The user then makes the appropriate selection. After selecting the items, Inference Engine 17 identifies the files containing the selected items. Inference Engine 17 then searches for the linkage(s) in Knowledge Base 14 connecting the identified files.

c. The Program Generator. Program Generator 18 accesses the linkages obtained by Information Scout 15 and generates the corresponding Source Program 19 to extract the information requested by the User.

d. The Compiler/Executor. The source program is compiled and executed against the database to generate the report using Compiler/Executor 20.

A more detailed description of one embodiment of these modules is now provided.

The Semantics Extractor

Figure 2:
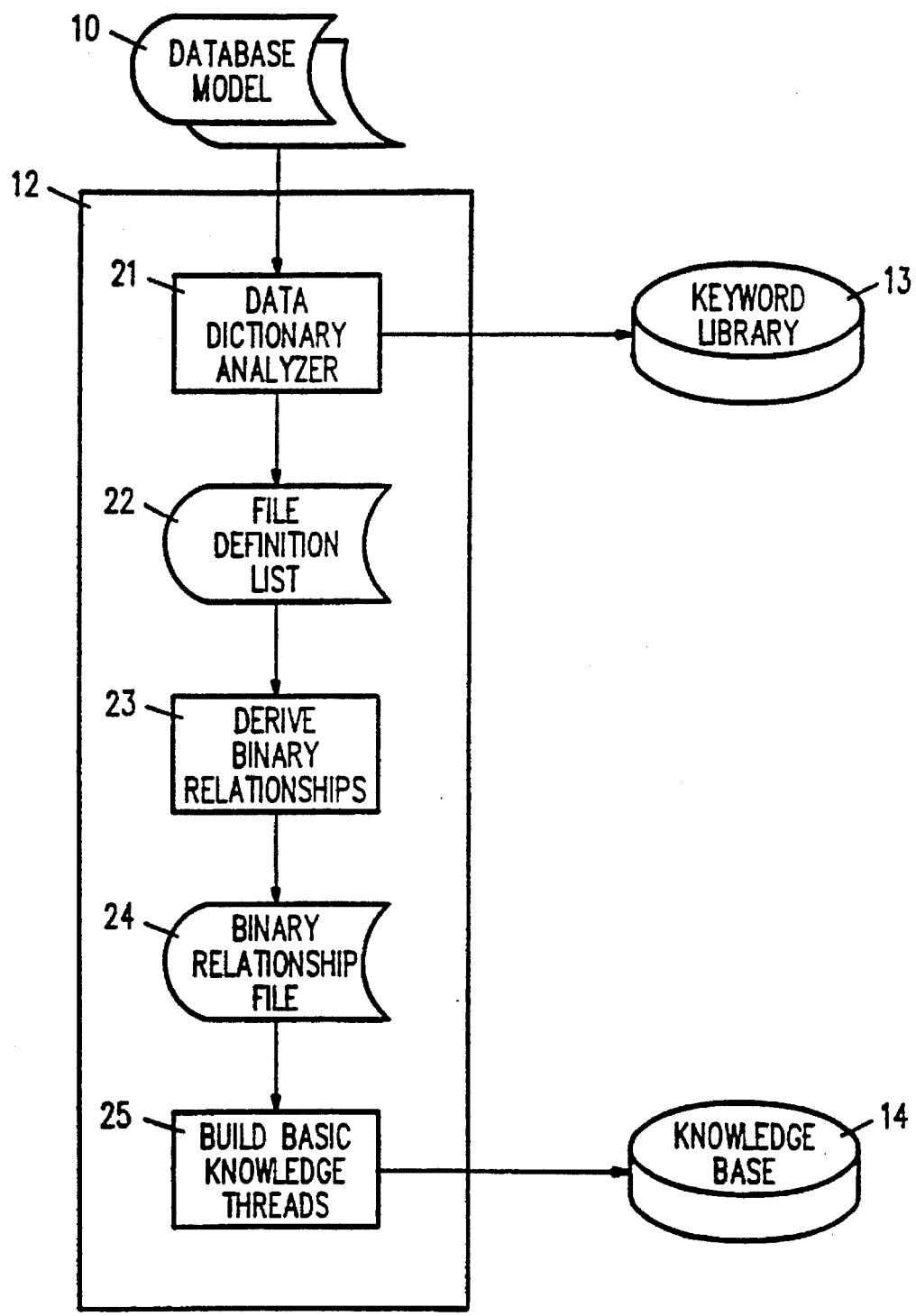
FIG. 2 is a flow chart depicting one embodiment of semantics extractor 12 of FIG. 1.

FIG. 2 shows a flow chart of Semantics Extractor 12. In order to extract the semantics of an application, an application system must have a data dictionary that represents the application data model. In the POWERHOUSE fourth generation language which is used in one embodiment, all data dictionaries are available and can be found in "QDD" or "PDL" formats. They are created by the analyst when developing an application system. The data dictionary is made up of system options, security and definitions of each element, file, record and item used in an application system. The data dictionary of Database Model 10 is parsed by Data Dictionary Analyzer 21 in order to obtain the keywords and the information about each file and item in Database Model 10.

The keywords are derived from the item definitions in the data dictionary in the following manner. The name of each item may be in the form of one complete word (e.g. SALARY) or may use more than one word separated with a hyphen (e.g. DATE-JOINED). Hyphens are removed from those item names with hyphens by Data Dictionary Analyzer 21. The resulting individual words obtained from the item names are then stored as keywords in Keyword Library 13, e.g. SALARY, DATE, and JOINED. These keywords are used later by Report Item Selector is 16 (FIG. 1).

Next, Knowledge Base 14 is built. The first step involves extracting the following information from each file in Database Model 10:

a. File name
b. For every item in each file
  i) Item name
  ii) Item type (e.g. character, numeric, date)
  iii) Item size
  iv) If an item is a key, its key type (e.g. unique key, repeating key) or non-key These files make up File Definition List 22 which is then used to determine the file relationships using the step Derive Binary Relationships 23. This step involves comparing each file definition in File Definition List 22 with the other file definitions in the same list to obtain its binary relationships with other files. A binary relationship consists of two files that can be linked. Two files can be linked if:

(i) both files have one item with the same name, AND
(ii) the item in the target (second) file is a unique or repeating key.

For example, in a Personnel Information System, the EMPLOYEES file would have an item called Emp-no which is a unique key to identify each employee and the SKILLS file would also have an item called Emp-no. Each record in a SKILLS file would contain a particular skill an employee has. As a single employee would have many different skills the Emp-no would be repeated for each skill and so would be a repeating key. These two files would form a binary relationship since Emp-no is the common item and Emp-no in SKILLS file is a repeating key. The item Emp-no in the source (first) file which in this example is the EMPLOYEES file need not be a key.

Often two items could be coded differently but mean the same thing, for example, both P-NO and PART-NO could be used to represent a part number in a Inventory Control System. P-NO may occur in some files and PART-NO in others. These two items are said to be in the same "domain" called P-NO as shown below:

| File name | Item name | Domain |
|---|---|---|
| A-PARTS-FILE | P-NO | P-NO |
| B-PARTS-FILE | PART-NO | P-NO |

In such a case, we would not be able to establish a file relationship between the two files as the item names are different. But it would still be meaningful to establish a link between the two files with such items as the items are in the same domain.

In the example above, both A-PARTS-FILE and B-PARTS-FILE have items in the same domain called P-NO though the item names are different. A-PARTS-FILE and B-PARTS-FILE should therefore be linked. The linkage rule defined earlier is thus modified as follows to take into account items with not only the same name but with different names in the same domain:

(i) both files have one item in the same domain, AND
(ii) the item in the target (second) file is a unique or repeating key.

For every linkage between two files, the item in the source file can be a unique key, repeating key or non-key while the target file must either be a unique or repeating key. From this restriction we can derive six possible valid types of file linkages. These are as follows:

| Source file | Target file | Notation |
|---|---|---|
| a. Unique key | Unique key | UU |
| b. Unique key | Repeating key | UR |
| c. Repeating key | Unique key | RU |
| d. Repeating key | Repeating key | RR |
| e. Non-Key | Unique key | NU |
| f. Non-Key | Repeating key | NR |

However, in one embodiment the repeating to repeating (RR) combination which is item d above is not stored because this represents a bad file design. A repeating to repeating relationship indicates a many to many relationship which preferably should not exist in a normalized data model. The analyst is informed of such a finding and attempt to rectify it.

All the binary relationships found using the above rules are stored as follows:

a. Source file
b. Source file item to link to target file
c. Target file
d. Target file item to link to source file
e. Relationship (e.g. UU,UR,RU,NU,NR)

From the earlier example using EMPLOYEES and SKILLS files, the binary relationship are stored as:

| Source file | Item | Target file | Item | Relationship |
|---|---|---|---|---|
| EMPLOYEES | Emp-no | SKILLS | Emp-no | UR |

The set of binary relationships derived from the above step is stored in a Binary Relationship File 24. The next step, namely Build Basic Knowledge Threads 25, involves deriving knowledge of Database Model 10 of an application system from these binary relationships which is then stored in Knowledge Base 14 in the form of knowledge threads. Each thread represents a linkage of many files. The following is an example of a knowledge thread:

EMPLOYEES→BRANCHES→EXPENSES

It contains an EMPLOYEES file linked to BRANCHES file which is then linked to EXPENSES file. Inference Engine 17 (FIG. 1) in Information Scout 15 later uses these threads in isolation or combination to infer the access paths in order to obtain the information requested by the user. For example, when the user wants to report the employees and their expenses in each branch, the above thread is used to generate the required path to navigate through an application database in order to acquire the required information.

Knowledge Base 14 is made up of basic and acquired knowledge threads. The following describes the derivation of basic knowledge threads by joining binary relationships from Binary Relationship File 24. The derivation of acquired knowledge threads is described later.

Figure 3:
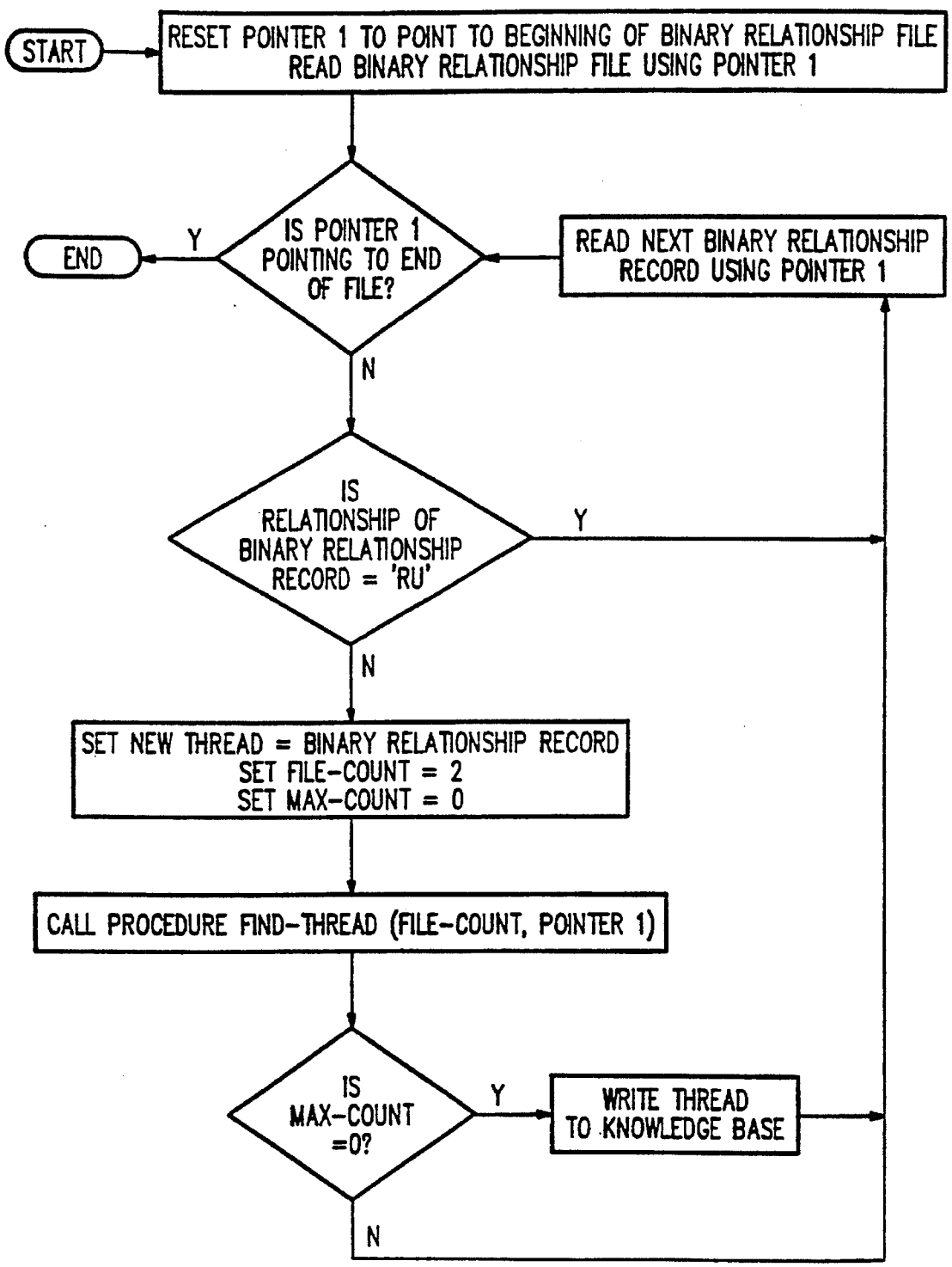
FIG. 3 is a flow chart depicting one embodiment of a method suitable for use to build basic knowledge threads step 25 of semantics extractor 12 of FIG. 2.

FIG. 3 is a flow chart of one method suitable for use as Build Basic Knowledge Threads 25 of FIG. 2. The following describes how a single basic knowledge thread is built using the method of FIG. 3, with reference to the following example of a procedure Find-Thread:

Procedure Find-Thread (file-count, pointer 2) begin old-file-count=file-count while (pointer 2 <> end of file) begin read binary relationship file using pointer 2 until (thread-end= source file of binary relation record) or (end of binary relationship file) if (binary relation record exists) and (target-file of record not exist in current-thread) then begin call Procedure Find-Thread(file-count, pointer 2) file-count= file-count+1 if (max-count<file-count) then max-count=file-count current-thread=current-thread+target-file reset pointer 2 to start of binary relationship file endif endwhile if file-count <> old-file-count then write current-thread into Basic Knowledge file end Note: Parameters file-count and pointer 2 are passed by value Current-thread, max-count are global variables The formation of each thread begins with a first binary relationship record read from Binary Relationship File 24. This record forms an initial thread. However, if the first binary relationship record is of type 'RU' (repeating to unique) relationship, it is ignored and no initial thread is formed from it. The next record is then read and if it still is of type 'RU', it is again ignored until the next record is found that is not of type 'RU', which is then used to form the initial thread. The reason for doing this is that it is only necessary to form threads using either 'RU' or 'UR' types and not both as they lead to the same access path being inferred by Inference Engine 17. In this embodiment we are using 'UR' types. To keep track of the next record to read from Binary Relationship File 24, a pointer called pointer 1 is used.

The initial thread can be extended by linking with other valid binary relationship records. To do so, Binary Relationship File is searched. This time another pointer, namely pointer 2, is used to keep track of the next record to read from Binary Relationship File 24 to link to the thread to be extended. A link to extend the thread is said to be found if the first file of the binary relationship record and the file at the end of the thread, called the thread-end file, are the same, or else the next binary relationship record is read using pointer 2. If a valid binary relationship record is found, we then examine if the target (second) file of this record is already in the thread. If it is not, it is added to the end of the thread, to become the thread-end. If it is, the next binary relationship record is read using pointer 2. The search ends when the end of Binary Relationship File 24 is reached using pointer 2. The formation of a single thread is then complete and is stored in Knowledge Base 14 as follows:

Thread-Head: . file name . file item to link to next file

Thread-Body: . file name . file item to link to the previous file . relationship to the previous file . file item to link to the next file Thread-End: . file name . file item to link to the previous file . relationship to the previous file The thread-head contains the first file and the first file item. It is linked to the next file using the thread-body or thread-end. The thread-body is made up of a file, its item which has the same domain as the item of the previous file it is linked to and the relationship to that file. It also contains another item which is used to link to the next file. The thread-end is similar to the thread-body except that it does not have the item to link to the next file.

The following example briefly shows how Knowledge Base 14 is built up with basic knowledge threads using the above procedure. Assume that Binary Relationship File 24 contains the following records:

| Source file | Item | Target file | Item | Relation-ship |
|---|---|---|---|---|
| 1. EMPLOYEES | Br-no | BRANCHES | Br-no | NU |
| 2. BRANCHES | Br-no | EXPENSES | Br-no | UR |
| 3. EMPLOYEES | Emp-no | BILLINGS | Emp-no | UR |
| 4. BILLINGS | Emp-no | EMPLOYEES | Emp-no | RU |
| 5. PROJECTS | Proj-no | BILLINGS | Proj-no | UR |
| 6. BILLINGS | Proj-no | PROJECTS | Proj-no | RU |

The method of this example is then as follows:

| Pointer 1 at | Thread Formed |
|---|---|
| 1st record of above file | Use the first binary relationship record EMPLOYEES link to BRANCHES as the valid binary relationship record to form the initial thread. Next, examine whether this thread can be extended by searching through the same Binary Relationship File, this time using pointer 2. It can be linked to the second binary relationship record, namely BRANCHES link to EXPENSES to form the final thread: EMPLOYEES → BRANCHES → EXPENSES |
| 2nd record | Similarly, using the next binary relationship BRANCHES link to EXPENSES record, form the initial thread: BRANCHES → EXPENSES This thread cannot be extended as the EXPENSES file cannot be linked to other binary relationship records. |
| 3rd record | Using the 3rd binary relationship the third thread EMPLOYEES → BILLINGS → PROJECTS is formed as follows:- EMPLOYEES links to BILLINGS via Emp-no BILLINGS links to PROJECTS via Proj-no This thread uses different items, namely Emp-no and Proj-no to link the two binary relationship records. |
| 4th record | No thread is formed as relationship is 'RU'. |
| 5th record | Thread formed is PROJECTS → BILLINGS → EMPLOYEES as follows: PROJECTS links to BILLINGS via Proj-no BILLINGS links to EMPLOYEES via Emp-no This thread uses different items, namely Proj-no and Emp-no, to link the two binary relationship records. |
| 6th record | No thread is formed as relationship is |

-continued

| Pointer 1 at | Thread Formed |
|---|---|
| | 'RU'. |

Each thread is stored in Knowledge Base 14 as follows, using the third thread above as example:
Thread-Head file=EMPLOYEES item=Emp-no
Thread-Body file=BILLINGS item-1=Emp-no relationship=UR item-2=Proj-no
Thread-End file=PROJECTS item=Proj-no relationship=RU

Information Scout

Figure 4:
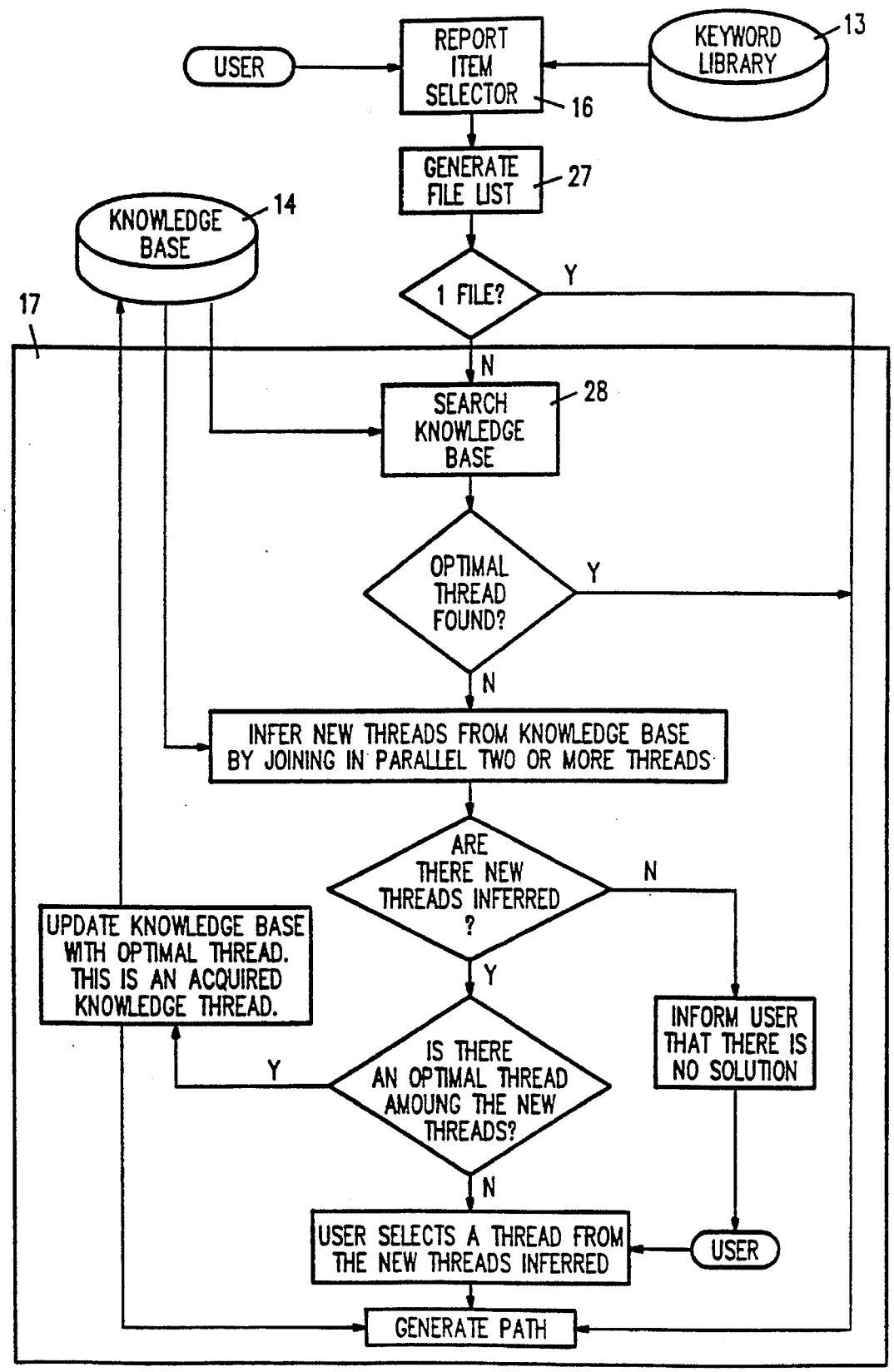
FIG. 4 is a flow chart depicting one embodiment of a method suitable for use as information scout 15 of the embodiment to FIG. 1.

FIG. 4 is a flow chart of one method suitable for use as Information Scout 15 of FIG. 1. Report Item Selector 16 first guides the user to select the items to be reported. Inference Engine 17 then infers the access path based on the items selected.

Report Item Selector

The user is prompted for a keyword or presented with a list of all the words in Keyword Library 13 to choose from. When the user chooses to provide a keyword, Report Item Selector 16 lists all the items that match the keyword provided. For example, the keyword DATE could return the following list of items containing the word DATE.

DATE BIRTH

DATE JOINED

DELIVERY DATE

LAST DATE UPDATE

The user then selects the desired item from the list. In one embodiment, an explanation of each item is also displayed. This explanation is either extracted from the data dictionary of an application system by Data Dictionary Analyzer 21 or entered by a programmer analyst maintaining the application system.

Using the above method, the user selects all the items to be reported. For each item, the file containing it is automatically identified and added to the file list using Generate File List Step 27. When two or more items are selected from the same file, only one entry is made in the file list. This file list is sorted such that the first file is the file which has the highest number of items selected and the other files are in descending order of items selected. When there is only one file in the list (that is, all the items selected come from the same file), no search of access paths is required. Otherwise, inference engine 17 is invoked to infer the access path.

Inference Engine

The first step involves searching for the optimal knowledge thread in Knowledge Base 14 to be used to generate an access path. If no optimal knowledge thread is found, the next step is to infer new knowledge threads, one of which is used to generate an access path (See FIG. 4). However, if no new threads can be inferred, then the user is informed that there is no solution.

Knowledge base 14 comprises two sections: basic and acquired knowledge threads. The basic knowledge section contains the knowledge threads that are generated by Semantics Extractor 12. The acquired knowledge section also contains knowledge threads but these are knowledge threads that have been inferred by Inference Engine 17. The process of acquiring these knowledge threads is explained later.

Figure 5:
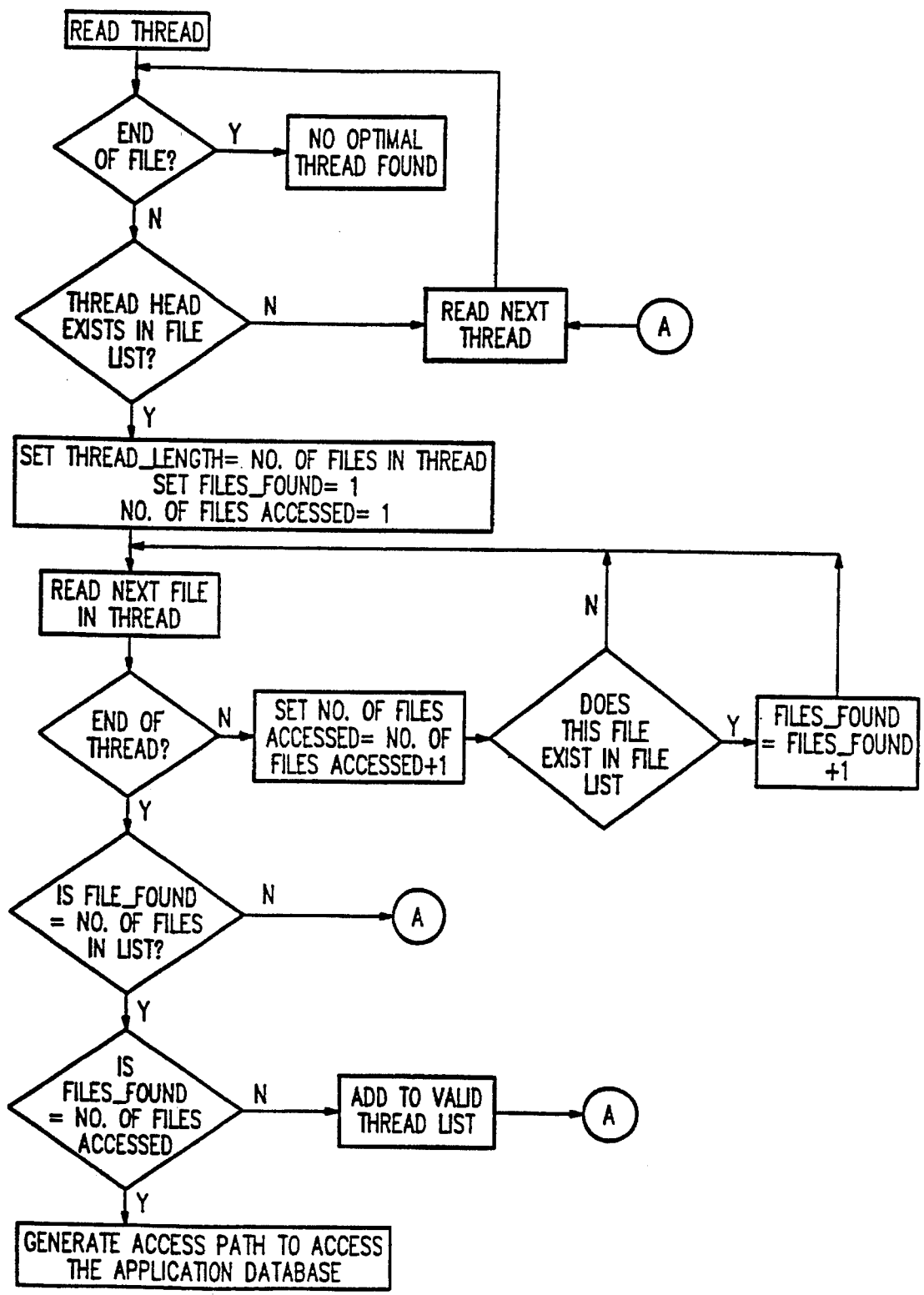
FIG. 5 is a flow chart depicting one embodiment of a method suitable for use as the search knowledge base step of the embodiment to FIG. 4.

In this embodiment, the search is made on the acquired knowledge section first. If a thread is found where all the files in the file list using step 27 of FIG. 4 exists on the thread, this thread used to generate the access path. When the search is unsuccessful, i.e. no acquired knowledge thread is found which can match all the files in the file list, the search proceeds using the basic knowledge section. FIG. 5 shows a flow chart of one method of performing the search for a knowledge thread from the basic knowledge section to be used to generate an access path.

The following example illustrates this search. Assume the file list from Step 27 in FIG. 4 has been build up from the items the user has selected and it contains two files as follows:

File list: EMPLOYEES BRANCHES

Assume that the basic knowledge section has the following three basic knowledge threads with EMPLOYEES as the threadhead:

Thread 1: EMPLOYEES→BRANCHES→EXPENSES

Thread 2: EMPLOYEES→PAY

Thread 3: EMPLOYEES→BILLINGS

We define the number of files accessed as the number of files in the thread which exists in the file list starting from the thread head.

Thread 1 has files which match all those in the file list, namely EMPLOYEES and BRANCHES. The number of files accessed in this case is two (EMPLOYEES→BRANCHES) and is equal to the number of files in the file list. This thread is considered an "optimal thread" as all the files in the file list exist contiguously on the thread starting from the thread-head. Thread 2 and 3 are invalid because BRANCHES is not found on the thread.

When an optimal thread is found, the search ceases and the optimal thread is used to generate the access path. In the above example, the thread EMPLOYEES→BRANCHES→EXPENSES is used to generate the access path but only up to the BRANCHES file with the EXPENSES file ignored or "trimmed out" as it is not required in this example of the user query. Otherwise, Inference Engine 17 attempts to infer new threads by joining two or more threads together in parallel (see FIG. 4). Those new threads that are found to be optimal, i.e. they have the number of files accessed equal to the number of files in the file list from step 27 of FIG. 4, are then classified as acquired knowledge threads and stored in the acquired knowledge section of Knowledge Base 14.

Figure 6A:
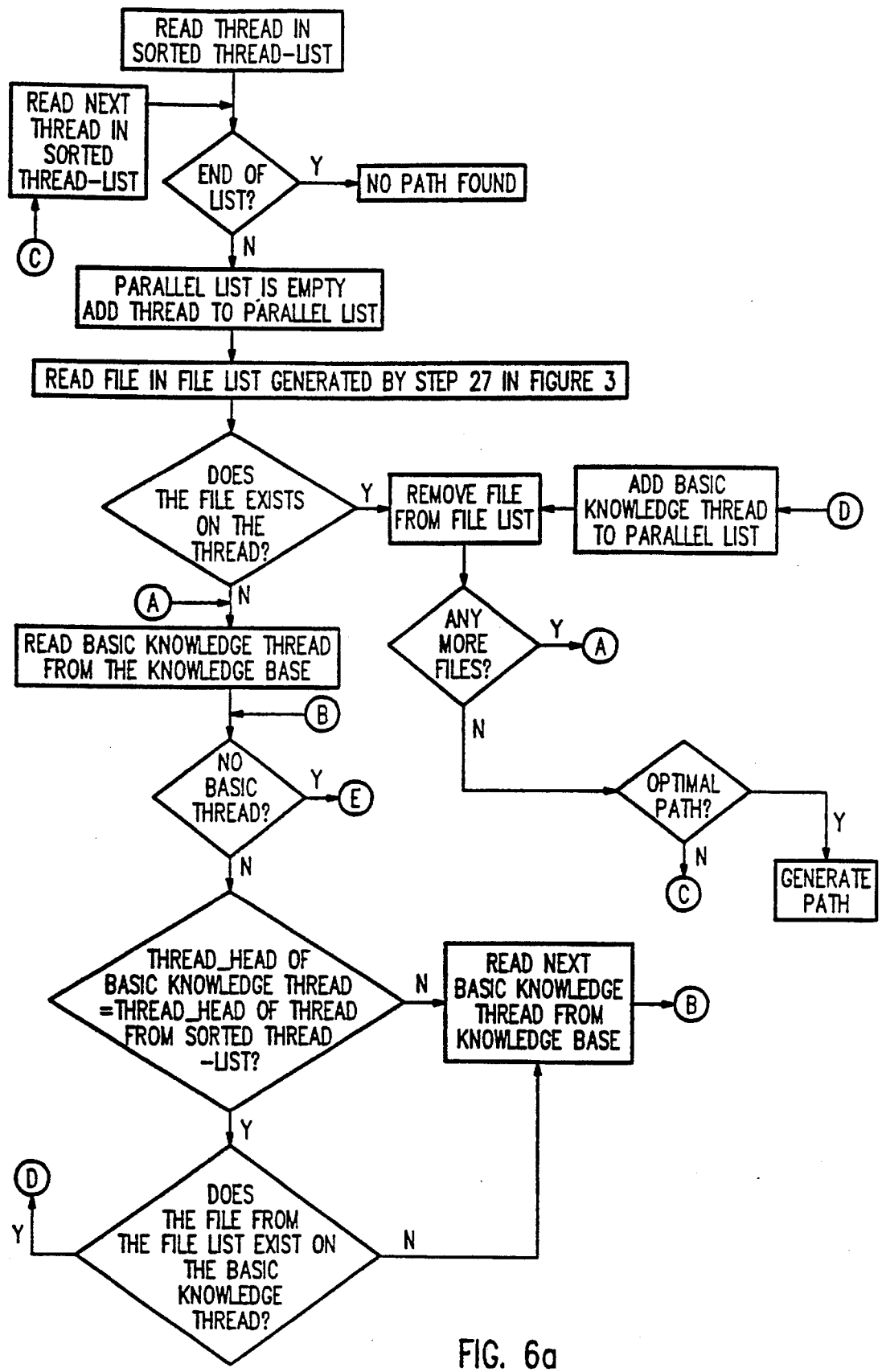
FIGS. 6a and 6b is a flow chart depicting one method suitable for use as the infer new threads from knowledge base step of the embodiment of FIG. 4.
Figure 6B:
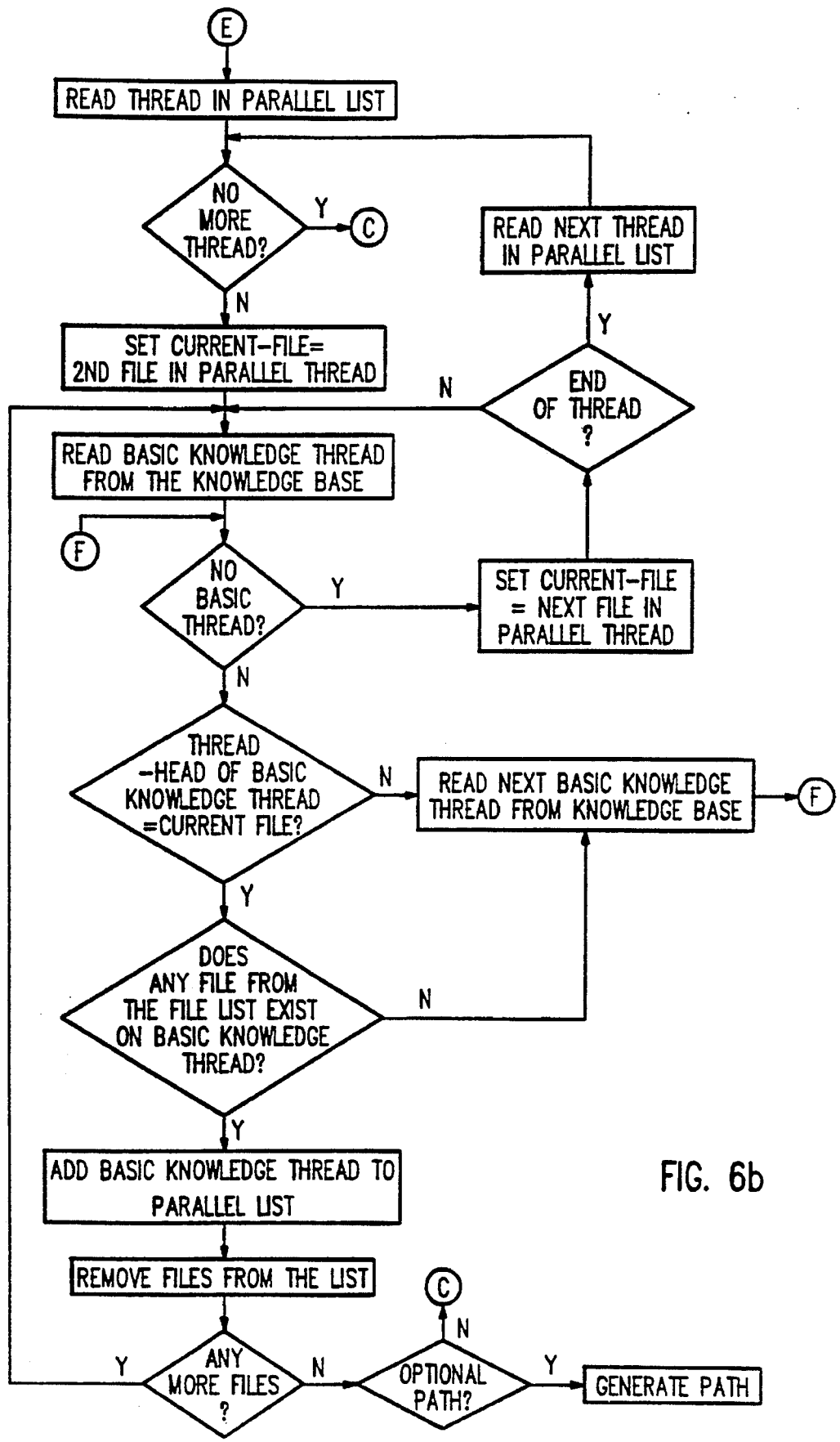

The following section describes the process of deriving acquired knowledge threads. Before inferring new threads, Inference Engine 17 must first generate a list of knowledge threads consisting of basic knowledge threads which have at least one file matching any file in the file list from step 27 of FIG. 4. This thread list is then sorted in descending order of the number of files in each thread matching those in the file list. Within this sorted list of knowledge threads, if there are more than one thread with the same number of files matching those in the file list, the threads are then sorted in ascending order of the number of files in each thread. This results in a knowledge thread that has the most number of files matching those in the file list but has the least number of files on the thread being at the top of the list. This forms the sorted thread-list. This list is then used to form new threads by joining in parallel two or more threads. FIGS. 6a and 6b form a flow chart of how these new threads are inferred from the sorted thread-list.

For ease of explanation of how the above procedure works, assume that the file list from step 27 of FIG. 4 contains the following three files:

EMPLOYEES

BRANCHES

PAY and the basic knowledge section of the Knowledge Base 14 contains the following three threads as before:

Thread 1: EMPLOYEES→BRANCHES→EXPENSES

Thread 2: EMPLOYEES→PAY

Thread 3: EMPLOYEES→BILLINGS

Thus there is no basic thread that contains all three files in the file list. Inference Engine 17 next employs parallel join inferencing. The basic knowledge threads which have at least one file found in the file list is extracted and sorted as follows:

| Thread-list: | No. of files in thread matching those in file list | Thread-length |
|---|---|---|
| 1. EMPLOYEES → PAY | 2 | 2 |
| 2. EMPLOYEES → BRANCHES → EXPENSES | 2 | 3 |
| 3. EMPLOYEES → BILLINGS | 1 | 2 |

The flow chart of FIGS. 6a and 6b is then applied. First, the thread EMPLOYEES→PAY is added to the parallel list. Next, the file EMPLOYEES is read from the file list. Since EMPLOYEES exists on this thread it is removed from the file list. The next file from the file list is then read and examined whether it exists in the same knowledge thread. Since it does, it is also removed. However, the next file from the file list, namely BRANCHES, does not exist in the knowledge thread. It therefore remains in the file list. The next step is to retrieve from Knowledge Base 14 the basic knowledge threads whose thread head (first file) is EMPLOYEES.

As stated earlier, the Knowledge Base contains the following basic knowledge threads:

1. EMPLOYEES→BRANCHES→EXPENSES
2. EMPLOYEES→PAY
3. EMPLOYEES→BILLINGS

The basic thread EMPLOYEES→BRANCHES→EXPENSES has the BRANCHES file and is therefore added to the parallel list. But before it is added, the EXPENSES file is removed as it is not a file in the file list. The parallel list now contains the following threads:

Parallel list: EMPLOYEES→PAY (obtained from the sorted thread list) EMPLOYEES→BRANCHES (obtained from the basic knowledge threads)

The above knowledge threads have a parallel relationship through the common file EMPLOYEES and form the parallel thread as follows:

| EMPLOYEES | → BRANCHES |
| | → PAY |

Next, the optimality test is applied. As the number of files accessed (which is earlier defined as the number of files in the thread starting from the thread-head) is equal to the number of files in the file list, an optimal solution has been found. This optimal thread is then added to Knowledge Base 14 as an acquired knowledge thread. However, if the optimality test fails, the above process to search for new parallel relationships is then repeated using the next thread on the sorted thread-list. If there are any new parallel relationships found, the optimality test is again applied.

In the event the sorted thread-list has been exhausted with no optimal acquired knowledge thread formed from the parallel relationships found, the user is prompted to select one of the parallel relationships found if there are more than one, or else the single parallel relationship found is used to generate the access path.

In cases where there are more than one parallel relationships, there may exist parallel relationships as follows:

| a. EMPLOYEE | → PAY |
| | → BRANCHES |
| b. EMPLOYEE | → BRANCHES |
| | → PAY |

As both these parallel relationships are semantically the same, one is redundant and is thus removed.

There may also be a case whereby there are no parallel relationships found after the sorted thread list has been exhausted. In such a case, there is no solution to the end-user query.

The inference method as illustrated in the flow chart of FIGS. 6a and 6b also takes into account inference of relationships using more than one file as common files. For example, the method is able to infer the following parallel relationships, whereby EMPLOYEES and PAY are the two common files:

EMPLOYEES→PAY→file1

EMPLOYEES→PAY→file2

These then form the parallel thread:

| EMPLOYEES → PAY | → file1 |
| | → file2 |

Program Generator

Based on the path inferred by Inference Engine 17, the corresponding QUIZ ACCESS statement is generated. In 'QUIZ', the file linkage is specified using the ACCESS statement with the following syntax:

ACCESS file [LINK item OF file TO item OF file]

[[{AND} item OF file TO item OF file]..]

{LINK} where ACCESS, LINK, AND, OF, TO are part of the 'QUIZ' syntax, file refers to the file name, item refers to the item name in the file to be linked,

[] means optional statement,

{} means choose one of the options i.e. AND or LINK,

.. means repeats one or more times

In QUIZ, there are two ways of defining a linkage between a number of files: hierarchical and parallel. A hierarchical linkage is defined with the "LINK . . . TO" option of the ACCESS statement. A parallel linkage is defined with the "AND . . . TO" option of the access statement.

When a single thread is used to generate the access path, the hierarchical link is used. When a combination of two or more threads are used a parallel link is used. From the earlier examples, 1. EMPLOYEES→BRANCHES uses the hierarchical linkage to generate ACCESS EMPLOYEES LINK Br-no OF EMPLOYEES TO Br-no OF BRANCHES

| 2. EMPLOYEES | → BRANCHES |
|---|---|
| | → PAY | uses the parallel linkage to generate ACCESS EMPLOYEES LINK Br-no OF EMPLOYEES TO Br-no OF BRANCHES AND Emp-no OF EMPLOYEES TO Emp-no OF PAY It should be noted that for a different language implementation, Inference Engine 17 and Knowledge Base 14 design need not change. Only the access path needs to be rewritten using the designated language.

Compiler Executor

After Source Program 19 is generated, Compiler/Executor 20 is used to compile Source Program 19 into executable code. The compiled program is then executed to produce the report. In this embodiment, Compiler/Executor 20 is the QUIZ part of POWERHOUSE fourth generation language.

ALTERNATIVE EMBODIMENTS

Several additional embodiments are also taught, as will now be described.

Figure 7:
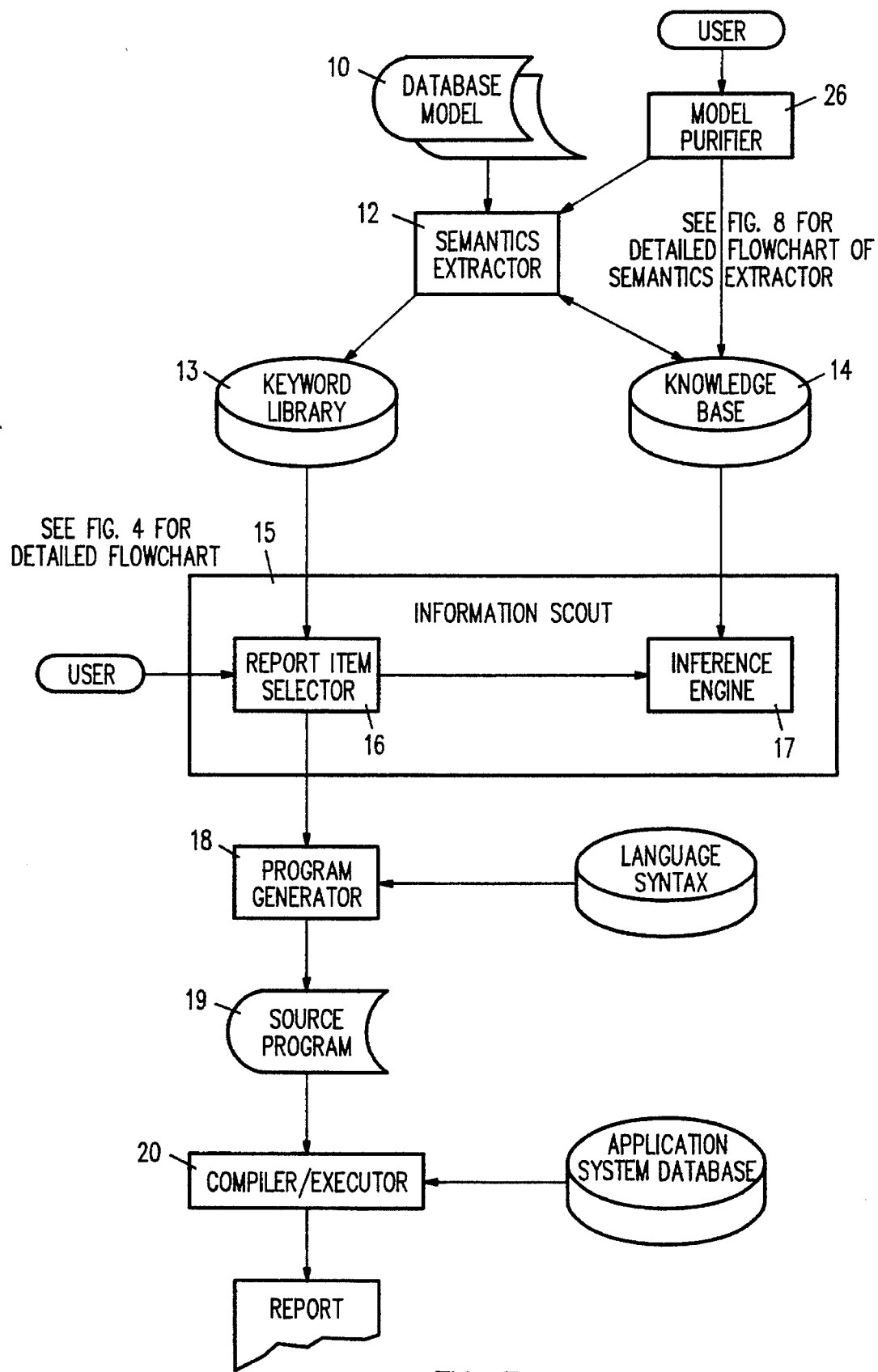
FIG. 7 is a flow chart depicting an alternative embodiment of this invention including a model purifier in accordance with this invention.

In one embodiment, a Model Purifier 26 is included which allows a user to add or alter the key type and binary relationships in Knowledge.Base 14 (FIG. 7). The Model Purifier interfaces with Semantics Extractor 12 to change Knowledge Base 14 accordingly.

In another embodiment, the functionality of Knowledge Base 14 is extended in order to store items that are derived from items in the database model. In this embodiment, the Model Purifier allows a user to input the specifications for the derived items. Derived items can also be obtained from source code of applications programs that access the database, in which case Semantics Extractor 12 serves to extract the derived item specifications from these programs. These derived items and their related database items together form a pseudo database file. Semantics Extractor 12 then uses this pseudo file to derive new binary relationships with normal database files and build new basic knowledge threads. The new binary relationships and new knowledge threads are then stored in Knowledge Base 14. In this embodiment, the functionality of Program Generator 18 is also extended so that after Inference Engine 17 has generated the access path which may contain pseudo database files as well as normal database files, Program Generator 18 uses this access path to generate source programs to obtain information from the normal database files and the pseudo database files.

In another embodiment, another component called the Security Model Specifer 29 is included to allow a user to input a security model which specifies the items of the database model that the user can access. This is called item security. The security model also specifies the range of values within an item that the user can access. This is called value security. To support this security, the functionality of Knowledge Base 14 is extended to store the security model. Functionality of Report Item Selector 16 and Program Generator 18 are also extended to use the security model in the Knowledge Base so that the information obtained from the database at query time meets the security model specification.

In another embodiment, the functionality of the Model Purifier is extended to allow a user to specify multiple domains for a data item and the aliases for a file containing this item. In this embodiment, the functionality of Program Generator 18 is also extended to generate the appropriate file alias statements in the source program to access the database to satisfy the user query.

FIG. 7 depicts one embodiment of this invention in which Model Purifier 26 is used. Model Purifier 26 serves to allow a user to add or alter the key type of items in Knowledge Base 14, e.g. the key type of an item can be changed from unique to repeating key. Model Purifier 26 is also used to allow a user to alter the binary relationships between database files located within Knowledge Base 14.

The rationale for the use of Model Purifier 26 in accordance with this embodiment of the present invention is that in some applications the database model or the application programs that access the database may not be rich enough for Semantics Extractor 12 to extract the necessary semantics including file linkages for the user to perform certain queries. Model Purifier 26 allow the user to input the additional semantics to satisfy these queries.

Figure 8:
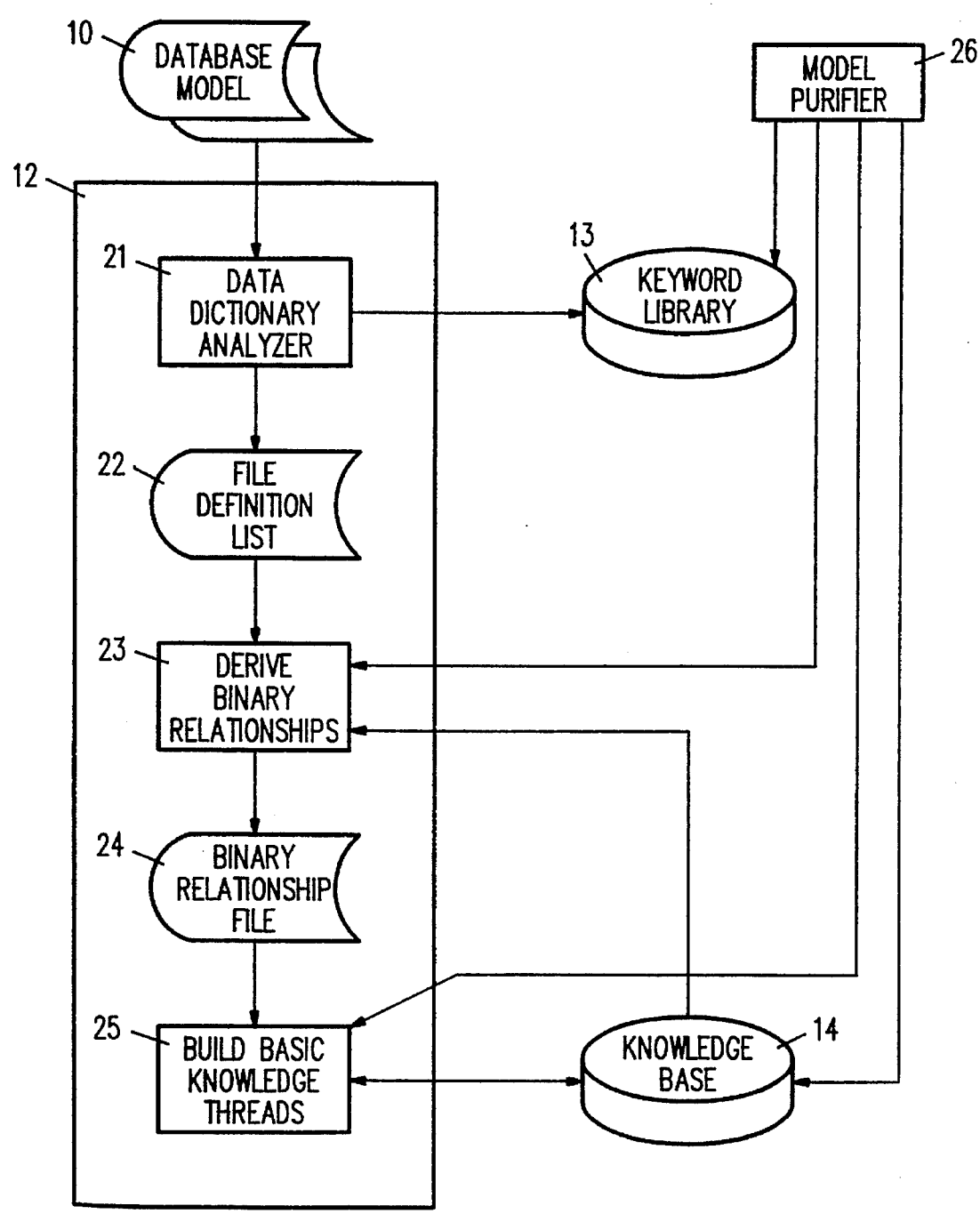
FIG. 8 is a flow chart depicting one embodiment of a semantics extractor constructed in accordance with the teachings of this invention interfacing with a model purifier.

FIG. 8 shows one embodiment of this invention in which Semantics Extractor 12 is extended to interface with Model Purifier 26. If the key types are altered, Model Purifier 26 activates Semantics Extractor 26 to re-derive the binary relationships and to rebuild the knowledge threads in Knowledge Base 14. If the binary relationships are altered, Model Purifier 26 activates Semantics Extractor 14 to rebuild the knowledge threads.

A user may specify an item or items to be reported that may not be found in Database Model 10. Examples of such items are as follows, which we called derived items as they are obtained by defining using the items of the database files:-

| | Derived Item | Defined as |
|---|---|---|
| (i) | Employee-Name | Firstname of Employee file + Lastname of Employee file |
| Note: | Firstname & Lastname are items of database file Employee | |
| (ii) | Sales-Commission | Sales-Amount of Invoice file x Commission Rate of Commission Table file |
| Note: | Sales-Account and Commission Rate are items of database file Invoice and Commission-Table, respectively | |
| (iii) | Total-Sales | sum of Sales-Amount of Invoice file for each month of the year |
| (iv) | Ratio-of-Jan-Sales to-Total-Sales | (Sales-Amount of Invoice file for January) ÷ (Total-Sales derived from (iii) above) |

Figure 9:
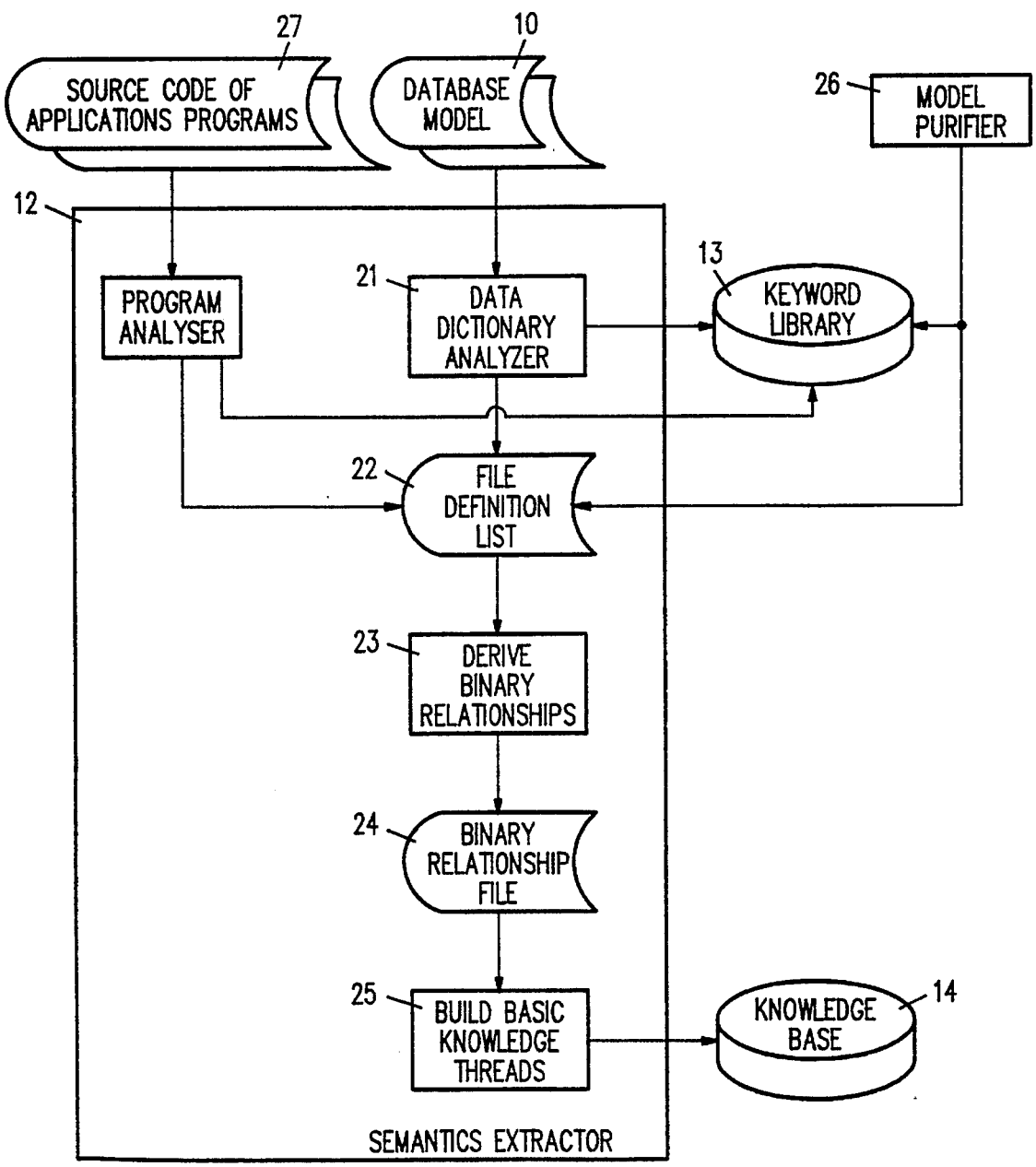
FIG. 9 is a flow chart depicting an alternative embodiment of a semantics extractor including a program analyzer in accordance with the teachings of this invention.

These derived items can be obtained from direct user input into Knowledge Base 14 or from Source Code of Application Programs 27 that access the database. To obtain such derived items from direct user input, the functionality of Model Purifier 26 is extended to meet this requirement. To obtain such derived items from Applications Programs 27, the functionality of Semantics Extractor 12 is extended with Program Analyzer 28 (see FIG. 9) to extract the derived items from these programs. In addition to the definitions of the derived items, the data type, size, and format of these derived items are also extracted from Applications Programs 27 by Program Analyzer 28 of Semantics Extractor 12. These derived items and their related database items together form a pseudo database file which is included in File Definition List 22 (see FIG. 9). Semantics Extractor 12 then uses this pseudo file in File Definition List 22 to derive new binary relationships with normal database files in File Definition List 22 and build new basic knowledge threads.

The new binary relationships and new knowledge threads are stored in Knowledge Base 14. Besides the Model Purifier 26 and Semantics Extractor 12, the Program Generator 18 is also extended so that after the Inference Engine has generated the access path which may contain pseudo database files as well as normal database files, the Program Generator 18 uses this access path to generate source programs to obtain information from the normal database files and pseudo database files.

The following is a description of one embodiment of an algorithm suitable for use by Program Analyzer 28 of Semantic Extractor 12 to extract the derived items in accordance with the teachings of this invention:

a. From a single pass application program

A single pass application program is a program that contains only one database access statement.

| | |
|---|---|
| Step 1: | Extract the database files that are accessed in the application program. |
| | For each database file accessed |
| | Extract the list of items of database file, |
| | Store this list and the database file name as a pseudo database file in the knowledge base. |
| | Next database file |
| Step 2: | Extract the list of derived items and their definitions from the application program |
| | For each derived item |
| | Scan for the data type, size and format, |
| | Store the derived item name, its definition, data type, size and format in the same pseudo database file obtained from step 1 above. |
| | Next derived item | b. From a multiple pass application program

A multiple pass application program consists of many single pass application program "stringed" together with the output of the previous pass being used as input by the current pass.

| | |
|---|---|
| Step 1: | Create a new pseudo database file 1 for the first pass (i = 1) using the steps of the single pass application program above. |
| Step 2: | For each of the remaining passes i.e. i = 2 to n with n being the last pass, Create a pseudo database file i Store the location of the previous database pseudo file (i = 1) in pseudo database file i. |

These derived items are then presented to the user together with the items from the database model for the user to select from in order to satisfy the user query.

In order to generate a program from the access path inferred by Inference Engine 17 that may contain pseudo database files, in addition to the above described extension of the functionality of Model Purifier 26 and Semantics Extractor 12, the functionality of Program Generator 18 is also extended as follows:

| | |
|---|---|
| Step 1: | Examine the access path generated by the Inference Engine 17. |
| Step 2: | For every file in the access path: |
| | If it is a pseudo database file, |
| | Then (i) generate source program to produce data for the pseudo database file using the derived item definitions; and |
| | (ii) generate source program to extract the information from both the database and the data of the pseudo database file produced by the program of step 2 (i) above. |
| | Next file |

In another embodiment, a security model specifies the items a user can access (item security) and the range of values within an item the user can access (value security). In item security, a user is assigned access rights to a subset of the list of items available in Knowledge Base 14. In value security, a user is assigned access rights to a range or ranges of values within an item in Knowledge Base 14. For example, the access rights could be DEPT-NO=101, SALARY<2000, or SALARY of PAY file if EMP-GRADE of EMPLOYEE file>8.

Figure 10:
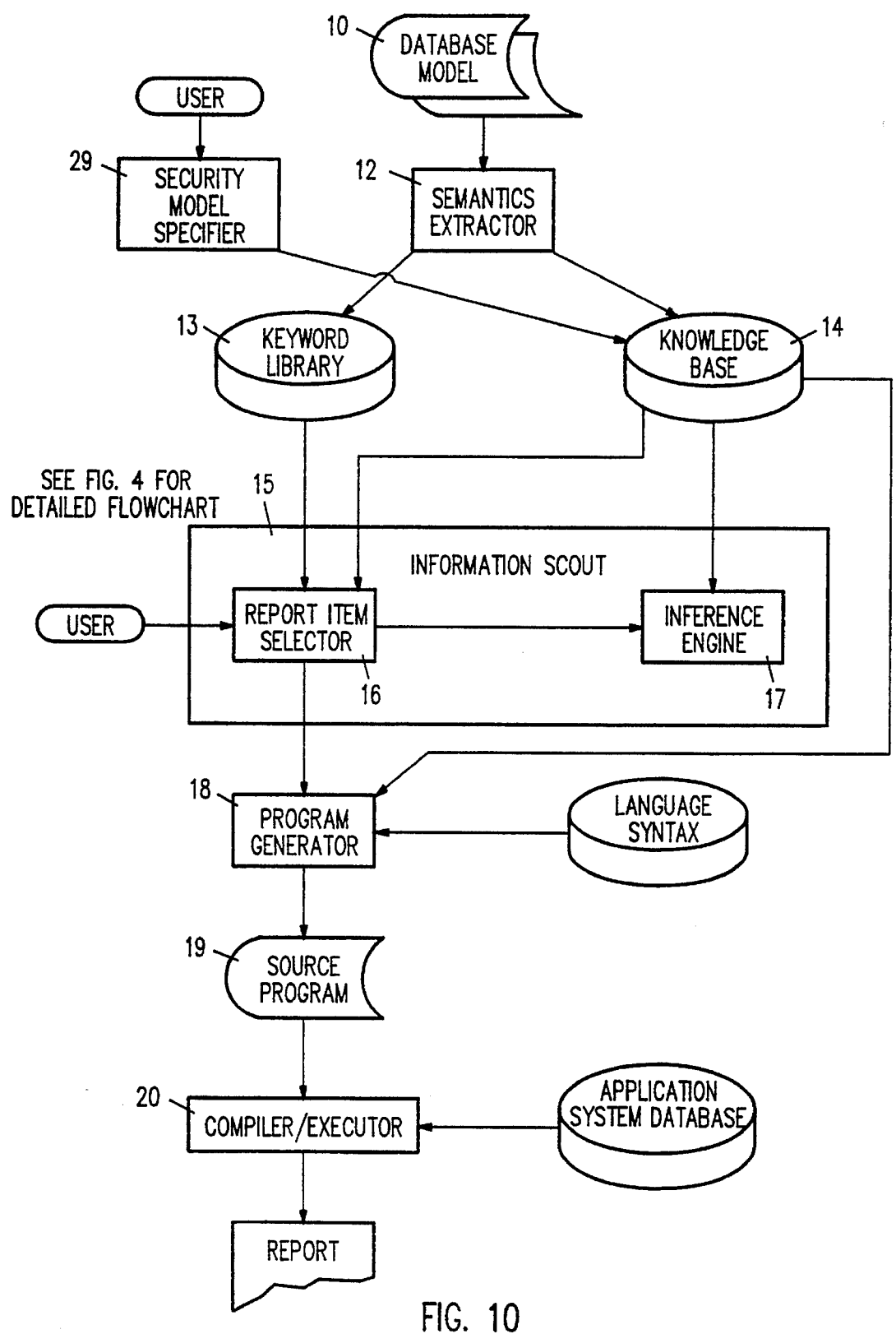
FIG. 10 is a flow chart depicting an alternative embodiment of this invention including a security model specifier.

FIG. 10 shows the Main Flowchart of one embodiment of the present invention which supports a security model. As shown in FIG. 10, Security Model Specifier 29 is provided for the user to input the security model into Knowledge Base 14. Also, in accordance with this embodiment, the functionality of Report Item Selector 16 and Generate File List 27 module (FIG. 4) of Information Scout 15, as well as Program Generator 18 are extended to support the security model as is now explained.

In one embodiment, the functionality of Report Item Selector 16 is extended such that only the items defined in the security model that are accessible by the user will be presented to the user for selection at query time.

In one embodiment, the functionality of Generate File List module 27 is extended to perform the following:

| | |
|---|---|
| Step 1: | For each query item selected |
| | Retrieve the file(s) containing the query item. |
| | Next query item |
| Step 2: | For each file retrieved in step 1 |
| | For each item in the file |
| | Retrieve any value security defined |
| | Next item |
| | Next file |
| Step 3: | For each value security retrieved in steps 1 and 2 |
| | If the security definition involves value from another file |
| | Then add the file to the file list for inferring the access path |
| | Next value security |

In one embodiment of this invention, the functionality of Program Generator 18 is extended to perform the following:

| | |
|---|---|
| Step 1: | For each query item selected |
| | Retrieve any value security defined on the item. |
| | Retrieve the file(s) containing the query item. |
| | Next query item |
| Step 2: | For each file retrieved in step 1 |
| | For each item in the file |
| | Retrieve any value security defined |
| | Next item |
| | Next file |
| Step 3: | For each value security retrieved in step 2 |
| | Join the value security definition using the AND condition. |

-continued

| | |
|---|---|
| Next value security | |

In yet another embodiment of this invention, the functionality of the Model Purifier is extended to specify multiple domains for a data item. An example of an item with multiple domains is Code Id of a database file called Master Code which may contain 2 items, namely Code Id and Code Description. The data for the Master Code file could, by way of example, be as follows:

| Code Id | Code Description |
|---|---|
| RACE01 | Chinese |
| RACE02 | Caucasian |
| . | |
| . | |
| . | |
| CITY01 | San Francisco |
| CITY02 | Singapore |
| . | |
| . | |
| . | |

In this example, this file is used to store codes for races and cities. However, races and cities are two separate domains. To break the codes into the two separate domains, the Code Id must be redefine as Race Code and City Code. The Master Code file will then have the following file aliases:

Race Master Code to contain Race Code Id
City Master Code to contain City Code Id To support this multiple domain for an item, we need to extend the Model Purifier to allow a user to specify the multiple domains and the corresponding file aliases. FIGS. 12 and 13 depict one embodiment of a main flowchart and Semantics Extractor 12 of the present invention which are capable of supporting multiple domains. The redefined items, eg Race Code Id and City Code Id, are stored in Keyword Library and the alias file(s) are stored in Knowledge Base 14. In this embodiment, the functionality of Program Generator 18 is extended to identify the alias file(s) in the access path generated by Inference Engine 17 and to generate the necessary alias file(s) statements in the source program.

There are also a number of alternative embodiments of this invention related to how the Knowledge Base is physically implemented. The various forms of implementations can be considered in the following manner:

a. Precreated versus Run-time Creation
b. Permanent Storage versus Temporary Storage
c. Outside the Database Model versus Inside the Database Model In precreated mode, the Knowledge Base is created once and used for every query over a period of time. Should the Database Model change, then the Knowledge Base is recreated to properly reflect the changed Database Model.

In run-time mode, the Knowledge Base is created at query time for every query, regardless of whether the Database Model has or has not changed since a previous query.

In permanent storage, the Knowledge Base is usually implemented in secondary storage devices such as a disk drives. In temporary storage the Knowledge Base is implemented in memory such as RAM (random access memory). A Precreated Knowledge Base is preferably (although not necessarily) implemented in permanent storage while a Run-Time Knowledge Base is preferably (although not necessarily) implemented in temporary storage. The reason is that as precreated knowledge is created once and reused many times, it would be beneficial to keep it permanent so that even if the electrical power to the computer system is switched off, the Knowledge Base is retained and can be used again once power is restored. In run-time mode, as the Knowledge Base is created at query time and not reused for the next query, it is not necessary to implement the Knowledge Base in permanent storage.

In POWERHOUSE fourth generation language, the database model is implemented in the data dictionary. In SQL database language, the database model is implemented in the system catalog.

In one embodiment of the present invention, the Knowledge Base is implemented outside the data dictionary or system catalog. In an alternative embodiment of the present invention, the Knowledge Base is implemented to reside partially or fully inside the data dictionary or system catalog, as the data dictionary or system catalog is a form of storage that can contain the Knowledge Base.

The invention now being fully described, it will be apparent to one of ordinary skill in the art that many changes and modifications can be made thereto without departing from the spirit or scope of the appended claims.

What is claimed is:

1. An end user query facility for accessing a database having a plurality of database files formed using a database model, comprising:

a knowledge base which stores key-types of items of said database files and a set of linkages of the database model;

a keyword library which stores a set of keywords of said database model representative of items of said database files;

a semantics extractor for reading said database model and extracting the semantics of said database model, and which stores in said knowledge base said key-types of items and said set of linkages and which stores in said keyword library said set of keywords;

an information scout for interfacing with a user to obtain from the user a designation of the information to be extracted from said database;

an inference engine which, based upon said designation of information to be extracted from said database, identifies one or more of said database files which Contain the desired information and searches said knowledge base to determine the linkage(s) connecting said one or more identified files;

a program generator which accesses the linkages obtained by said inference engine and generates a program to extract said desired information from said database; and a model purifier for interfacing with a user to alter said key-types of items and said set of linkages in the knowledge base.

2. An end-user query facility as in claim 1 wherein said model purifier further comprises an interface with said semantics extractor in order to re-derive said set of linkages based upon said altered key-types.

3. An end-user query facility as in claim 1 wherein said model purifier further comprises:

means to interface with a user deriving new item(s) and new file(s) using items of said database files;

means to store said new item(s) in said keyword library; and means to interface with said semantics extractor to derive new linkages using said new files with said database files.

4. An end-user query facility as in claim 3 wherein said model purifier further comprises means to interface with said semantics extractor to derive new basic knowledge threads using said new linkages of said new files with said database files.

5. An end-user query facility as in claim 1 wherein said model purifier further comprises means for a user to specify and store in said keyword library multiple domains for item(s) of said database files, to specify file aliases for said database files containing such item(s), and to interface with said semantics extractor to derive new linkage using said file aliases with said database files.

6. An end-user query facility as in claim 5 wherein said model purifier further comprises means to interface with said semantics extractor to build new basic knowledge threads using said new linkages of said file aliases with said database files.

7. An end-user query facility as in claims 5 or 6 wherein said program generator further comprises means to generate file alias statements in said program to extract said desired information from said database.

8. An end-user query facility as in claim 1 wherein said model purifier further comprises an interface with said semantics extractor in order to rebuild basic knowledge threads in said knowledge base based upon said altered key types and said altered set of linkages.

9. An end user query facility for accessing a database having a plurality of database files formed using a database model, comprising:
- a knowledge base which stores a set of linkages of the database model;
- a semantics extractor for reading said database model and extracting the semantics of said database model, and which stores in said knowledge base said set of linkages;
- an information scout for interfacing with a user to obtain from the user a designation of the information to be extracted from said database;
- an inference engine which, based upon said designation of information to be extracted from said database, identifies one or more of said database files which contain the desired information and searches said knowledge base to determine the linkage(s) connecting said one or more identified files;
- a program generator which accesses the linkages obtained by said inference engine and generates a program to extract said desired information from said database; and
- a program analyzer which analyzes and derives new items and new files from source code of application programs that access said database model.

10. An end-user query facility as in claim 9 wherein said program analyzer further comprises an interface with said semantics extractor to derive new linkages using said new files with said database files.

11. An end user query facility as in claim 10 wherein said program analyser further comprises an interface with said semantics extractor to build new basic knowledge threads using said new linkages of said new files with said database files.

12. An end-user query facility as in claims 3 or 9 wherein said program generator further comprises means to generate source program that produce data from said new items of said new files and wherein said end-user query facility further comprises a compiler for compiling said source program.

13. An end user query facility for accessing a database having a plurality of database files formed using a database model, comprising:
- a knowledge base which stores a set of linkages of the database model;
- a semantics extractor for reading said database model and extracting the semantics of said database model, and which stores in said knowledge base said set of linkages;
- an information scout for interfacing with a user to obtain from the user a designation of the information to be extracted from said database;
- an inference engine which, based upon said designation of information to be extracted from said database, identifies one or more of said database files which contain the desired information and searches said knowledge base to determine the linkage(s) connecting said one or more identified files;
- a program generator which accesses the linkages obtained by said inference engine and generates a program to extract said desired information from said database; and
- a security model specifier to allow a user to input a security model which specifies restrictions on the information a user can obtain from said database.

14. An end-user query facility as in claim 13 wherein:
- said knowledge base further comprises means to store said security model;
- said information scout further comprises means to use said security model; and
- said program generator further comprises means to generate said program to extract said information for said database that conform to the security model.

15. An end user query facility as in claim 13 wherein said security model comprises:
- item security which specifies a set of database files and items selected from said database a user or class of users can access; and
- value security which specifies a set of conditions to restrict said user or said class of users to a certain range(s) of values of said database.

16. An end-user query facility as in claim 1, 9 or 13 wherein said semantics extractor comprises means for deriving basic knowledge threads comprising a set of linkages of said database model and storing said basic knowledge threads in said knowledge base.

17. An end-user query facility as in claim 16 wherein each of said basic knowledge threads comprises a set of two or more of said database files serially linked together such that one file is linked to the next file through an item that has the same domain as the item in the next file and that this same item is a unique or repeating key of the next file.

18. An end user query facility for accessing a database having a plurality of database files formed using a database model, comprising:
- a knowledge base which stores a set of linkages of the database model;
- a semantics extractor for reading said database model and extracting the semantics of said database model, and which stores in said knowledge base said set of linkages;
- an information scout for interfacing with a user to obtain from the user a designation of the information to be extracted from said database;
- an inference engine which, based upon said designation of information to be extracted from said database, identifies one or more of said database files which contain the desired information and searches said knowledge base to determine the linkage(s) connecting said one or more identified files; and a program generator which accessed the linkages obtained by said inference engine and generates a program to extract said desired information from said database; and a model purifier for interfacing with a user to obtain new linkages and to store said new linkages in the knowledge base.

19. An end user query facility for accessing a database having a plurality of database files formed using a database model, comprising:

a knowledge base which stores key-types of items of said database files and a set of linkages of the database model;

a keyword library which stores a set of keywords of said database model representative of items of said database files;

a semantics extractor for reading said database model and extracting the semantics of said database model, and which stores in said knowledge base said key-types of items and said set of linkages and which stores in said keyword library said set of keywords;

an information scout for interfacing with a user to obtain from the user a designation of the information to be extracted from said database;

an inference engine which, based upon said designation of information to be extracted from said database, identifies one or more of said database files which contain the desired information and searches said knowledge base to determine the linkage(s) connecting said one or more identified files;

a program generator which accesses the linkages obtained by said inference engine and generates a program to extract said desired information from said database; and a model purifier for a user to define new item(s) and new file(s) using items of said database file.

20. An end user query facility as in claim 19 wherein said model purifier comprises:

means to store said new item(s) in said keyword library; and means to interface with said semantics extractor to derive new linkages using said new files with said database files.

21. An end user query facility for accessing a database having a plurality of database files formed using a database model, comprising:

a knowledge base which stores key-types of items of said database files and a set of linkages of the database model;

a keyword library which stores a set of keywords of said database model representative of items of said database files;

a semantics extractor for reading said database model and extracting the semantics of said database model, and which stores in said knowledge base said key-types of items and said set of linkages and which stores in said keyword library said set of keywords;

an information scout for interfacing with a user to obtain from the user a designation of the information to be extracted from said database;

an inference engine which, based upon said designation of information to be extracted from said database, identifies one or more of said database files which contain the desired information and searches said knowledge base to determine the linkage(s) connecting said one or more identified files;

a program generator which access the linkages obtained by said inference engine and generates a program to extract said desired information from said database; and a model purifier comprising means for a user to specify and store in said keyword library multiple domains for item(s) of said database files, to specify file aliases for said database files containing such item(s), and to interface with said semantics extractor to derive new linkages using said file aliases with said database files.

22. An end user query facility for accessing a database having a plurality of database files formed using a database model, comprising:

a knowledge base which stores a set of linkages of said database model;

a semantics extractor for reading said database model and extracting the semantics of said database model, and which stores in said knowledge base said set of linkages;

an information scout for interfacing with a user to obtain from the user a designation of the information to be extracted from said database;

an inference engine which, based upon said designation of information to be extracted from said database, identifies one or more of said database files which contain the desired information and searches said knowledge base to determine the linkage(s) connecting said one or more identified files;

a program generator which accesses the linkages obtained by said inference engine and generates a program to extract said desired information from said database; and a model purifier comprising means for a user to define key-types for items of said database.

23. An end user query facility as in claim 22 wherein said model purifier comprises means for causing said semantics extractor to derive new linkages using said key-types of items and to store said new linkages in said knowledge base.

24. An end user query facility as in claim 1 or 22 wherein said key-types are unique key, repeating key and non-key.

25. An end-user query facility as in claim 1 or 22 wherein said key-types comprise primary key, foreign key, and non-key.

26. An end user query facility as in claims 1, 9, 13, 18, 19, 21, or 22 wherein said program comprises a source code program, and wherein said end user query facility further comprises a compiler for compiling said source program.

27. An end user query facility as in claims 1, 9, 13, 18, 19, 21, or 22 wherein said information scout comprises:

means for obtaining from a user a user supplied keyword indicative of the data desired to be extracted from said database;

means for determining using said keyword library all keywords in said database model having a predefined relationship with said user supplied keyword; and means for causing a user to select one or more of said keywords having a predefined relationship, said one or more keywords thus selected serving as said designation of the information to be extracted from said database.

28. An end-user query facility as in claims 1, 9, 13, 18, 19, 21, or 22 wherein said inference engine comprises:
   means for inferring new acquired knowledge threads and storing said new acquired knowledge threads in said knowledge base; and
   means for determining an access path to said database using either said basic knowledge threads or said acquired knowledge threads as required to meet the user query.

29. An end-user query facility as in claim 28 wherein said acquired knowledge thread is derived through a combination in parallel of two or more of said basic knowledge threads such that one of the said basic knowledge threads has one or more of its consecutive files in common with the corresponding number of consecutive files starting from the thread head of another of said basic knowledge threads.

30. An end-user query facility as in claim 29 wherein said thread head is a first file on a said basic knowledge thread.

31. An end-user query facility as in claims 1, 9, 13, 18, 19, 21, or 22 wherein said semantics extractor further comprises means for reading source code of application programs that access said database, extracting the semantics of said application programs and storing in said knowledge base said set of linkages.

32. An end-user query facility as in claims 1, 9, 13, 18, 19, 21, or 22 wherein said knowledge base comprises pre-created knowledge base.

33. An end-user query facility as in claims 1, 9, 13, 18, 19, 21, or 22 wherein said knowledge base comprises a run-time created knowledge base.

34. An end-user query facility as in claims 1, 9, 10, 31, 33, 35, or 36 wherein said knowledge base comprises a persistent knowledge base.

35. An end-user query facility as in claims 1, 9, 13, 18, 19, 21, or 22 wherein said knowledge base comprises a transient knowledge base.

36. An end-user query facility as in claims 1, 9, 10, 31, 33, 35, or 36 wherein said knowledge base is implemented in said data dictionary of said database model.

37. An end-user query facility as in claims 1, 9, 13, 18, 14, 21, or 22 wherein said knowledge base is implemented in said system catalog of said database model.

* * * * *